United States Patent
Ryu

(10) Patent No.: US 9,151,932 B2
(45) Date of Patent: Oct. 6, 2015

(54) REFLECTIVE TYPE TELEPHOTO LENS AND PHOTOGRAPHING APPARATUS INCLUDING THE SAME

(71) Applicant: SAMSUNG ELECTRONICS CO., LTD., Suwon-si, Gyeonggi-do (KR)

(72) Inventor: Jae-myung Ryu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 127 days.

(21) Appl. No.: 13/969,242

(22) Filed: Aug. 16, 2013

(65) Prior Publication Data

US 2014/0049841 A1 Feb. 20, 2014

(30) Foreign Application Priority Data

Aug. 20, 2012 (KR) .................. 10-2012-0090900

(51) Int. Cl.
*G02B 13/02* (2006.01)
*G02B 17/08* (2006.01)

(52) U.S. Cl.
CPC ............ *G02B 13/02* (2013.01); *G02B 17/0808* (2013.01)

(58) Field of Classification Search
USPC .......................................... 359/745
See application file for complete search history.

(56) References Cited

U.S. PATENT DOCUMENTS

| 4,666,259 A | * | 5/1987 | Iizuka | ............... | 359/731 |
| 2013/0010180 A1 | * | 1/2013 | Hatakeyama | ............... | 348/360 |

* cited by examiner

*Primary Examiner* — James Jones
(74) *Attorney, Agent, or Firm* — Drinker Biddle & Reath LLP

(57) ABSTRACT

A reflective type telephoto lens and a photographing apparatus including the reflective type telephoto lens are provided. The reflective type telephoto lens includes: a first lens that receives an incident flux of light from an object side; a main mirror including a reflective unit that reflects light transmitted through the first lens toward the object side, and a transmission portion disposed on a center portion thereof; a sub-mirror group including a sub-mirror that reflects light from the main mirror toward an image side; and a focusing lens group that focuses the light reflected by the sub-mirror.

22 Claims, 13 Drawing Sheets

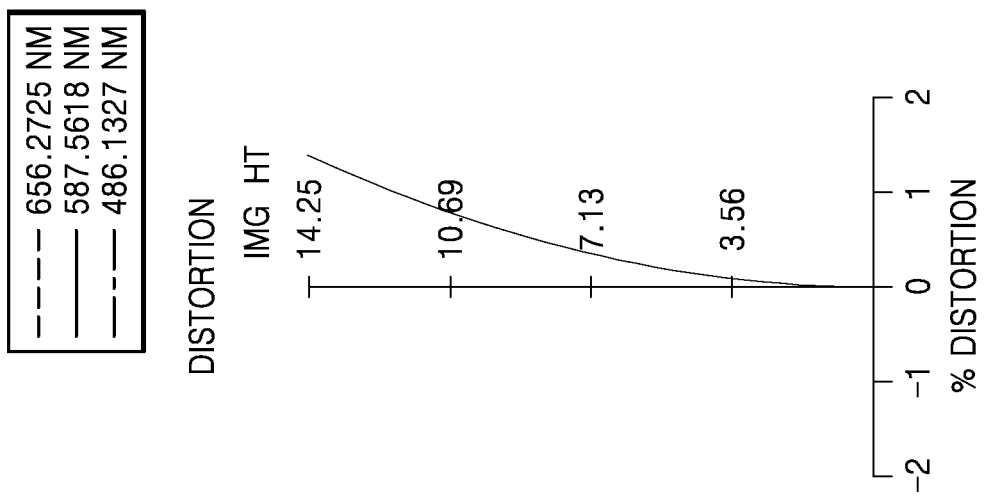
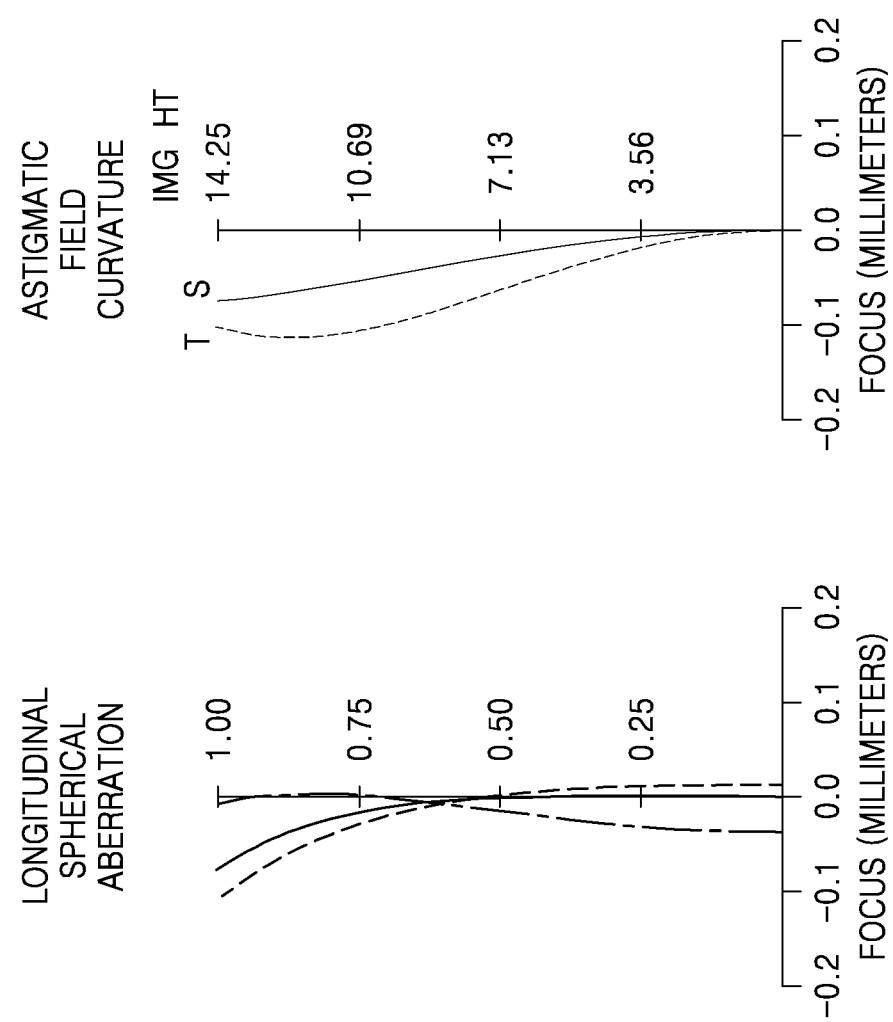
FIG. 16

REFLECTIVE TYPE TELEPHOTO LENS AND PHOTOGRAPHING APPARATUS INCLUDING THE SAME

CROSS-REFERENCE TO RELATED PATENT APPLICATION

This application claims the priority benefit of Korean Patent Application No. 10-2012-0090900, filed on Aug. 20, 2012, in the Korean Intellectual Property Office, the disclosure of which is incorporated herein in its entirety by reference.

BACKGROUND

1. Field

Various embodiment of the invention relate to a compact reflective type telephoto lens and a photographing apparatus including the reflective type telephoto lens.

2. Related Art

Recently, there is a demand for a lens system, which can focus an object in a photographing device (such as a charge-coupled device (CCD) or a complementary metal oxide semiconductor (CMOS)), having a small size and less power consumption. Such a photographing apparatus may include a digital still camera, a video camera, and a single lens reflex (SLR) camera.

Also, the number of consumers who have professional knowledge about cameras has increased. According to demands of market, a lot of telephoto lenses are being developed, and the telephoto lenses may be classified as telephoto lenses using refractive lenses and reflective type telephoto lenses using concave and convex mirrors of a Cassegrain type. Although a telephoto lens system using a lens group having a positive refractive power and a lens group having a negative refractive power from an object side has been used generally, the entire length of such a telephoto lens system is longer than that of a reflective telephoto lens of the Cassegrain type, and thus the reduction of the length of the lens system is limited.

SUMMARY

Various embodiments of the invention provide a reflective type telephoto lens that is compact.

Various embodiments also provide a reflective type telephoto lens that performs a focusing operation using a light focusing lens group.

Various embodiments provide a photographing apparatus including a reflective type telephoto lens that is compact.

According to an embodiment, a reflective type telephoto lens includes: a first lens that receives an incident flux of light from an object side; a main mirror including a reflective unit that reflects light transmitted through the first lens toward the object side, and a transmission portion disposed on a center portion thereof; a sub-mirror group including a sub-mirror that reflects light from the main mirror toward an image side; and a focusing lens group that focuses the light reflected by the sub-mirror, wherein the reflective type telephoto lens satisfies the following inequality $$0.4 \leq \frac{f_{before}}{f} \leq 0.8,$$

where $f_{before}$ denotes a combined focal length of the first lens, the main mirror, and the sub-mirror group located in front of the focusing lens group, and f denotes an entire focal length of the reflective type telephoto lens.

According to another embodiment, a reflective type telephoto lens includes: a first lens that receives an incident flux of light from an object side; a main mirror including a reflective unit that reflects light transmitted through the first lens toward the object side, and a transmission portion disposed on a center portion thereof; a sub-mirror group including a sub-mirror that reflects light from the main mirror toward an image side; and a focusing lens group that focuses the light reflected by the sub-mirror, wherein the reflective type telephoto lens satisfies the following inequality $$0.9 \leq \left|\frac{f_{primary}}{f_{secondary}}\right| \leq 1.5,$$

where $f_{primary}$ denotes a focal length of the main mirror, and $f_{secondary}$ denotes a focal length of the sub-mirror group.

The reflective type telephoto lens may satisfy following inequality $$0.1 \leq \left|\frac{f_{AF}}{f}\right| \leq 0.6,$$

where $f_{AF}$ denotes a focal length of the focusing lens group, and f denotes the entire focal length of the reflective type telephoto lens.

The focusing lens group may include three or less lenses.

The focusing lens group may include at least one biconcave lens.

The focusing lens group may include a biconvex lens and a biconcave lens.

The focusing lens group may include a planoconvex lens and a biconcave lens.

The focusing lens group may include a biconvex lens, a biconcave lens, and a planoconvex lens.

A stop may be disposed between the sub-mirror and the focusing lens group.

The sub-mirror group may include a second lens next to the sub-mirror.

The first lens may include an accommodation portion disposed on a center portion thereof, and the sub-mirror group is disposed in the accommodation portion.

The focusing lens group may be disposed on an optical axis between the main mirror and the sub-mirror.

The reflective type telephoto lens may have a half-viewing angle ranging from 2° to 3°.

An entire length of the reflective type telephoto lens may not be changed when the focusing lens group performs a focusing operation.

According to another embodiment, a photographing apparatus includes: a reflective type telephoto lens and an imaging device that receives light focused by the reflective type telephoto lens. The reflective type telephoto lens may include: a first lens that receives an incident flux of light from an object side; a main mirror including a reflective unit that reflects light transmitted through the first lens toward the object side, and a transmission portion disposed on a center portion thereof; a sub-mirror group including a sub-mirror that reflects light from the main mirror toward an image side; and a focusing lens group that focuses the light reflected by the sub-mirror, wherein the reflective type telephoto lens satisfies the following inequality $$0.4 \le \frac{f_{before}}{f} \le 0.8,$$

where $f_{before}$ denotes a combined focal length of the first lens, the main mirror, and the sub-mirror group located in front of the focusing lens group, and f denotes an entire focal length.

According to another embodiment, a photographing apparatus includes: a reflective type telephoto lens and an imaging device that receives light focused by the reflective type telephoto lens. The reflective type telephoto lens may include: a first lens that receives an incident flux of light from an object side; a main mirror including a reflective unit that reflects light transmitted through the first lens toward the object side, and a transmission portion disposed on a center portion thereof; a sub-mirror group including a sub-mirror that reflects light from the main mirror toward an image side; and a focusing lens group that focuses the light reflected by the sub-mirror, wherein the reflective type telephoto lens satisfies the following inequality $$0.9 \le \left| \frac{f_{primary}}{f_{secondary}} \right| \le 1.5,$$

where $f_{primary}$ denotes a focal length of the main mirror, and $f_{secondary}$ denotes a focal length of the sub-mirror group.

BRIEF DESCRIPTION OF THE DRAWINGS

The above and other features and advantages will become more apparent by describing in detail exemplary embodiments thereof with reference to the attached drawings in which:

FIG. 16 is a diagram showing aberration of the reflective type telephoto lens of FIG. 14.

DETAILED DESCRIPTION

Hereinafter, a reflective type telephoto lens and a photographing apparatus according to respective embodiments of the invention will be described in detail with reference to accompanying drawings.

Figure 1:
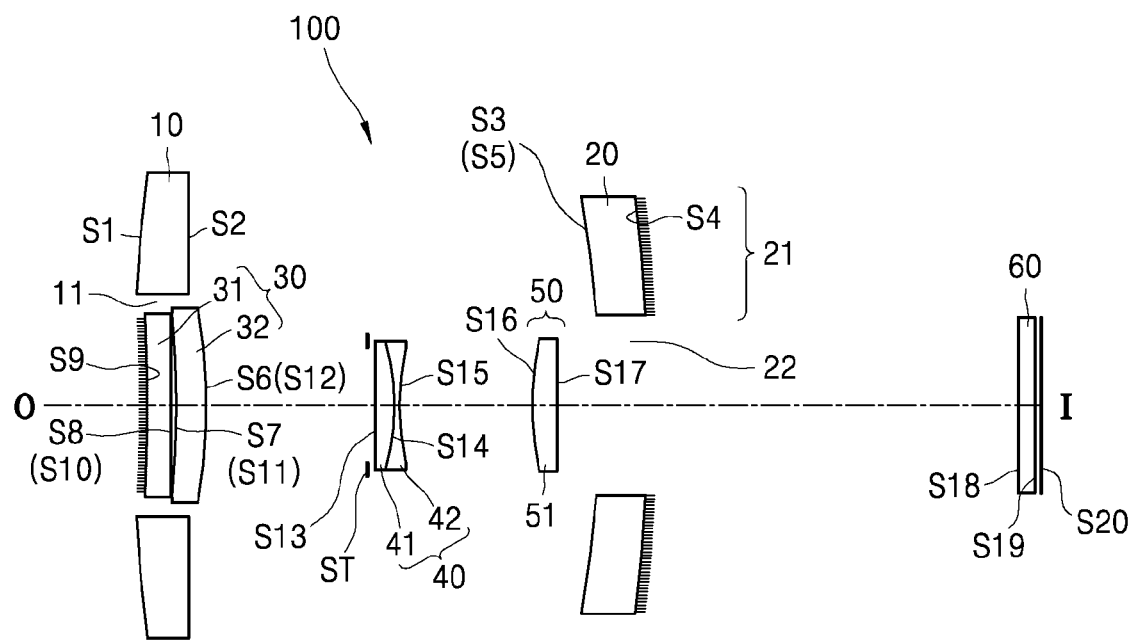
FIG. 1 is a diagram showing a reflective type telephoto lens with respect to an infinite object distance, according to an embodiment.
Figure 2:
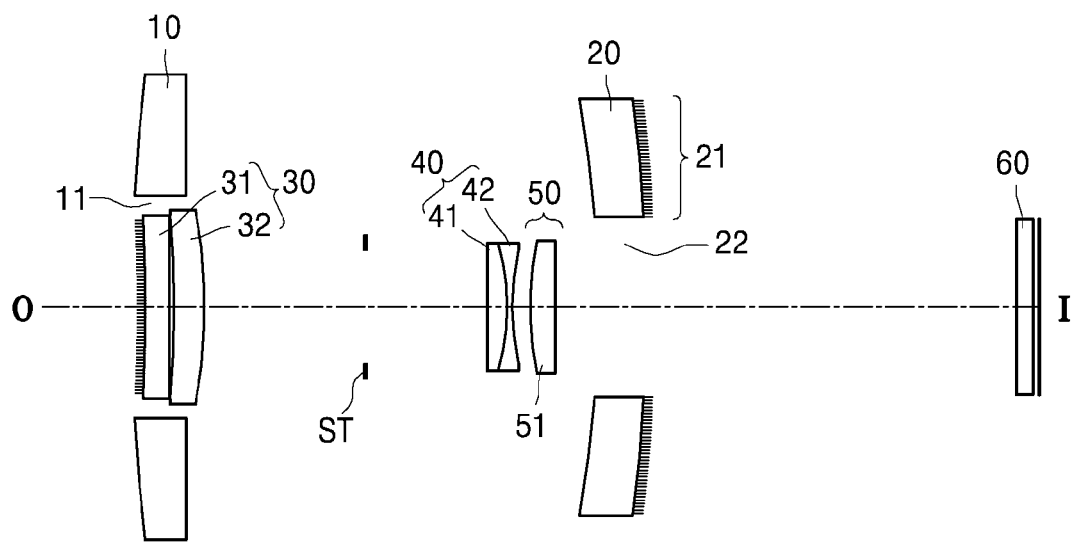
FIG. 2 is a diagram showing the reflective type telephoto lens of FIG. 1 with respect to a definite object distance (e.g., obj=4 m)

FIG. 1 is a diagram showing a reflective type telephoto lens 100 with respect to an infinite object distance, according to an embodiment, and FIG. 2 is a diagram showing the reflective type telephoto lens 100 of FIG. 1 with respect to a definite object distance (e.g., obj=4 m), according to the present embodiment.

Referring to FIGS. 1 and 2, the reflective type telephoto lens 100 according to the present embodiment includes a first lens 10 that receives an incident flux of light from an object side O, a main mirror 20 that reflects light transmitted through the first lens 10 toward the object side O, a sub-mirror group 30 including a sub-mirror 31 that reflects the light from the main mirror 20 toward an image side I, and a focusing lens group 40 that focuses the light reflected by the sub-mirror 31.

The main mirror 20 may include a reflective unit 21 that reflects the light from the first lens 10, and a transmission portion 22 that transmits the light. The transmission portion 22 is an opening that is disposed on a center portion of the main mirror 20 with respect to an optical axis, and the reflective unit 21 may be disposed on a peripheral portion of the main mirror 20 with respect to the optical axis.

The first lens 10 may include an accommodation portion 11 (e.g., an opening) disposed on a center portion thereof. The sub-mirror group 30 may be disposed in the accommodation portion 11. The sub-mirror group 30 may further include a second lens 32 at the image side I of the sub-mirror 31 to correct aberration. However, the first lens 10 may not include the accommodation portion 11, and the sub-mirror group 30 may be disposed on the image side I of the first lens 10.

The main mirror 20 may be configured to have, for example, a positive refractive power, to converge a ray of light. The sub-mirror 31 may include a positive refractive power or a negative refractive power.

Meanwhile, the sub-mirror 31 may shield light incident from the object side O. The shielding of light may also be performed by a barrel (not shown) supporting the sub-mirror 31, as well as by the sub-mirror 31. Thus, in the present embodiment, a diameter of the sub-mirror 31 may be less than an entrance pupil or a diameter of the first lens 10 on which light from the object side O is initially incident. When the sub-mirror 31 is small, an effective F number of the reflective type telephoto lens 100 is reduced, thereby resulting in a bright optical system. Since a size of the sub-mirror 31 is affected by the refractive power of the main mirror 20 in the reflective type telephoto lens 100, the size of the sub-mirror 31 may be controlled by adjusting the refractive power of the main mirror 20. Since a general refractive type telephoto lens has a long focal length, the entire length of the lens system is increased. However, the optical path may be folded using the main mirror 20 and the sub-mirror 31 in the reflective type telephoto lens 100, and thus, the lens system having a relatively shorter length when compared with the refractive type telephoto lens may be realized. That is, in the reflective type telephoto lens 100, a ray of light is initially reflected by the main mirror 20 having a relatively larger diameter toward the object side O, and then, is secondarily reflected by the sub-mirror 31 having a relatively shorter diameter toward the image side I. Thus, the entire length of the reflective type telephoto lens 100 may be reduced.

The focusing lens group 40 may include three or less lenses. Since the focusing lens group 40 is configured to include three or less lenses, a focusing speed may be increased, and a load of a driving unit for driving the focusing lens group 40 may be reduced, thereby reducing power consumption. The focusing lens group 40 may include at least one biconcave lens. When the focusing lens group 40 has a negative focal length, the focusing lens 40 may move toward the image side I when taking a picture at near distance.

For example, as shown in FIG. 1, the focusing lens group 40 may include a first lens 41 and a second lens 42. The first lens 41 may be a biconvex lens or a planoconvex lens, and the second lens 42 may be a biconcave lens. The focusing lens group 40 may be disposed on an optical axis between the main mirror 20 and the sub-mirror 31. In addition, an additional lens group 50 may be further disposed on the image side I of the focusing lens group 40. For example, the additional lens group 50 may include a third lens 51.

Figure 5:
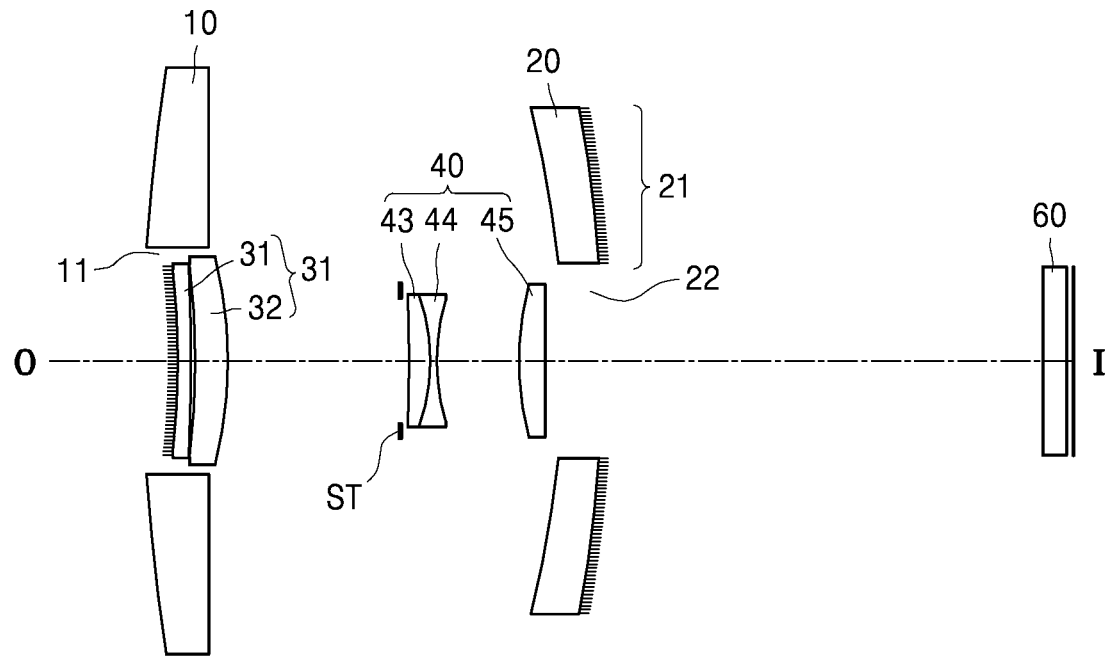
FIG. 5 is a diagram showing a reflective type telephoto lens with respect to an infinite object distance, according to another embodiment.
Figure 6:
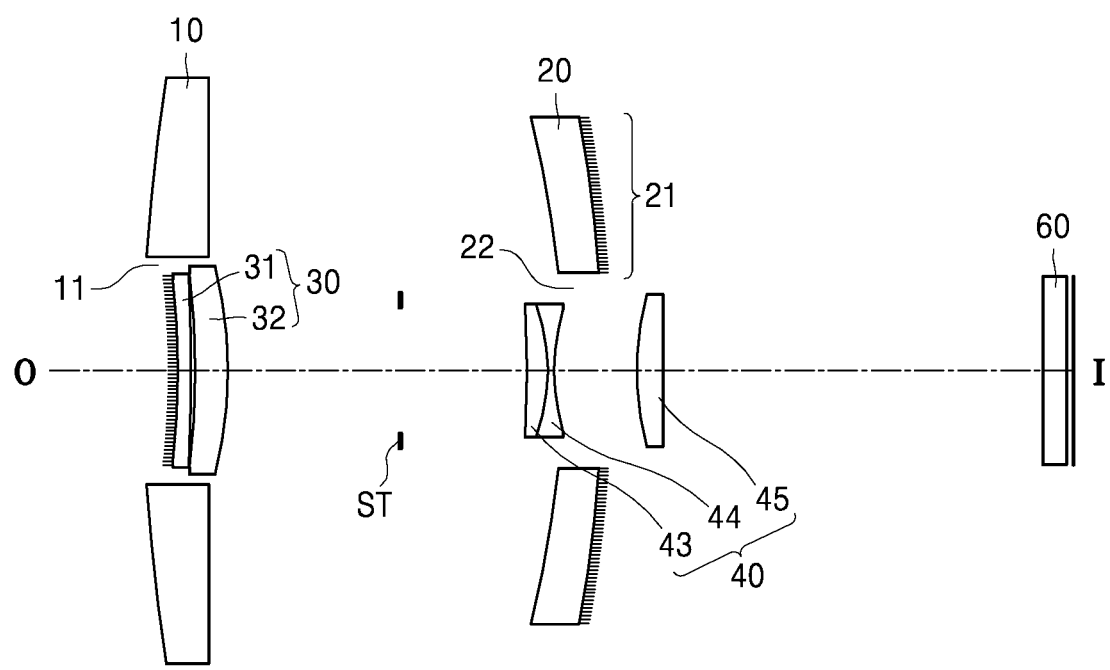
FIG. 6 is a diagram showing the reflective type telephoto lens of FIG. 5 with respect to a definite object distance (e.g., obj=4 m)

FIG. 5 is a diagram showing a reflective type telephoto lens with respect to an infinite object distance, according to another embodiment, and FIG. 6 is a diagram showing the reflective type telephoto lens with respect to a definite object distance (e.g., obj=4 m), according to the embodiment. Referring to FIGS. 5 and 6, the focusing lens group 40 may include a fourth lens 43, a fifth lens 44, and a sixth lens 45. The fourth lens 43 may be a biconvex lens or a planoconvex lens, the fifth lens 44 may be a biconcave lens, and the sixth lens 45 may be a planoconvex lens.

Figure 9:
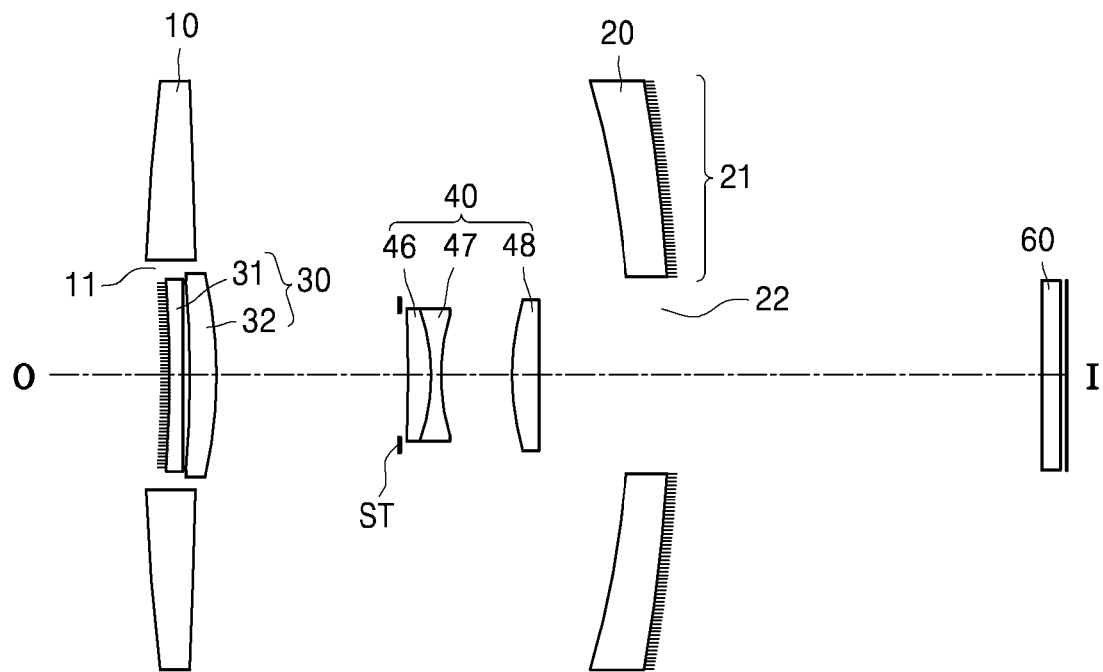
FIG. 9 is a diagram showing a reflective type telephoto lens with respect to an infinite object distance, according to another embodiment.
Figure 10:
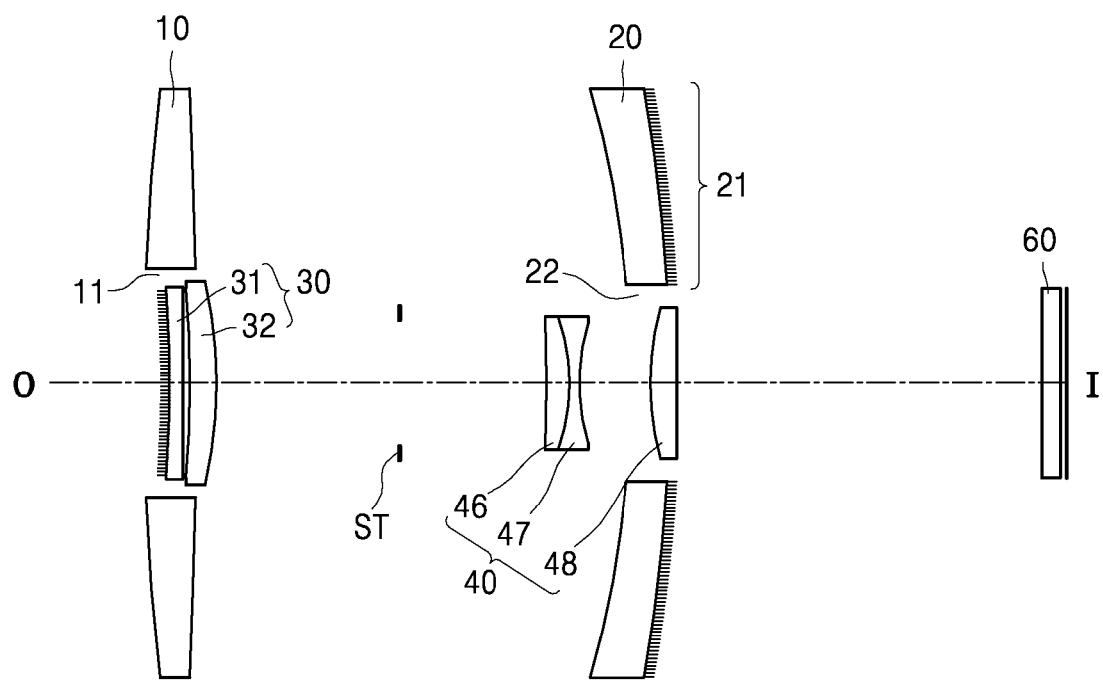
FIG. 10 is a diagram showing the reflective type telephoto lens of FIG. 9 with respect to a definite object distance (e.g., obj=4 m)

FIG. 9 is a diagram showing a reflective type telephoto lens with respect to an infinite object distance, according to another embodiment, and FIG. 10 is a diagram showing the reflective type telephoto lens with respect to a definite object distance (e.g., obj=4 m), according to the embodiment. Referring to FIGS. 9 and 10, the focusing lens group 40 includes a seventh lens 46, an eighth lens 47, and a ninth lens 48. The seventh lens 46 may be a biconvex lens or a planoconvex lens, the eighth lens 47 may be a biconcave lens, and the ninth lens 48 may be a planoconvex lens.

When the focusing lens group 40 performs a focusing operation, the entire length of the reflective type telephoto lens is not changed. Therefore, the reflective type telephoto lens may be compact. Here, the entire length of the reflective type telephoto lens is a length from the outermost object surface of the first lens 10 to an image surface img. The image surface img may be a surface of an imaging device 112 referred to in FIG. 17.

Meanwhile, the reflective type telephoto lens 100 may have a half-viewing angle ranging from 2° to 3° at an infinite object distance.

The reflective type telephoto lens 100 may satisfy the following inequality (1).

$$0.4 \leq \frac{f_{before}}{f} \leq 0.8 \quad (1)$$

Here, $f_{before}$ before denotes a combined focal length of a lens and a mirror in front of the focusing lens group 40. For example, $f_{before}$ denotes a combined focal length of the first lens 10, the main mirror 20, and the sub-mirror group 30, and f denotes the entire focal length of the reflective type telephoto lens 100.

In order to make the focusing lens group 40 light weight, a diameter of the focusing lens may be formed to be small. To do this, the ray of light may be converged in front of the focusing lens group 40. That is, the combined focal length of the first lens 10 and the sub-mirror group 30 located in front of the focusing lens group 40 has to be small. However, if the combined focal length is excessively small, an aberration load of the focusing lens group 40 increases, thereby degrading performance of the reflective type telephoto lens 100 or increasing production sensitivity. When the combined focal length of the first lens 10 and the sub-mirror group 30 in front of the focusing lens group 40 is within the range of above inequality 1, excellent optical property may be obtained while reducing the diameter of the focusing lens group 40.

The reflective type telephoto lens 100 may satisfy the following inequality (2).

$$0.9 \leq \left| \frac{f_{primary}}{f_{secondary}} \right| \leq 1.5 \quad (2)$$

Here, $f_{primary}$ denotes a focal length of the main mirror 20, and $f_{secondary}$ denotes a focal length of the sub-mirror group 30. In the embodiments, the sub-mirror group 30 may include one reflective lens and one refractive lens, and in this case, the light reflected by the main mirror 20 is incident on a reflective surface of the sub-mirror group 30 (ninth surface S9 in each of the embodiments) and then reflected again to the focusing lens group 40. For example, the light enters through the first surface S1 and the second surface S2 of the first lens 10, then enters the third surface S3 of the main mirror 20, and is reflected by the fourth surface S4. The reflected light then exits the main mirror 20 through the fifth surface S5, enters the sub-mirror group 30 through the sixth surface S6 and seventh surface S7 of the second lens 32, and enters the sub-mirror 31 through the eighth surface S8. Next, the light reflected by the main mirror 20 is reflected by the ninth surface S9 of the sub-mirror 31, exits the sub-mirror 31 through the tenth surface S10, and re-enters the second lens 32 through the eleventh surface S11. The twice reflected light finally exits the second lens 32 through the twelfth surface S12 and travels to the image side I through the focusing lens group 40, the additional lens group 50, and the at least one filter 60. Thus, the focal length of the sub-mirror group 30 represents the combined focal length from a sixth surface S6 to a twelfth surface S12.

Above inequality (2) is used to obtain a bright optical system by reducing a light shielding amount due to the sub-mirror 31 of the reflective type telephoto lens 100. Since some of the incident light is obscured by the sub-mirror 31, brightness of the reflective type telephoto lens 100 may be reduced. Therefore, the size of the sub-mirror 31 may be reduced to be as small as possible. Inequality (2) represents a ratio of focal lengths of the main mirror 20 and the sub-mirror group 30, and when the ratio between the focal lengths of the main mirror 20 and the sub-mirror group 30 satisfies a range of inequality (2), the reflective type telephoto lens 100 having a small value of F number may be obtained by reducing the obscured amount of light. Here, F number (FNo) is a value excluding the obscured amount of light due to the sub-mirror 31, and is referred to as an effective FNo.

The reflective type telephoto lens 100 may satisfy the following inequality (3).

$$0.1 \le \left|\frac{f_{AF}}{f}\right| \le 0.6 \quad (3)$$

Here, $f_{AF}$ denotes a focal length of the focusing lens group 40, and f denotes the entire focal length of the reflective type telephoto lens 100.

Inequality (3) is about a focal length of the focusing lens group 40, which is necessary to ensure a photographable distance to an object side. The focal length of the focusing lens group 40 may be short in order to ensure the photographable distance to the object side. In this case, variation of the image plane according to variation in the distance to the object side may be compensated for. If a value of $$\left|\frac{f_{AF}}{f}\right|$$

is less than the lower value, the aberration load of the focusing lens group 40 is increased, thereby degrading the performance of the reflective type telephoto lens 100 or increasing the producing sensitivity. On the other hand, if the value of $$\left|\frac{f_{AF}}{f}\right|$$

is greater than the higher value, the photographable distance to the object side may not be ensured.

Therefore, when the inequality (3) is satisfied, the photographable distance to the object may be ensured and the performance variation due to movement of the focusing lens group 40 may be reduced, thereby improving the product specification and resolution.

In the embodiments, the reflective type telephoto lens is formed as follows. Hereinafter, EFL denotes an entire focal length (mm), FNo denotes an F number, HFOV (Half Field Of View) denotes a half-viewing angle (°), R denotes a radius of curvature, Dn denotes a distance between lenses or a thickness of lens, H-Aper (Half-aperture) denotes a radius of an effective aperture of a lens, obscuration denotes a radius of the accommodation portion 11 on a center portion of the first lens 10 and a radius of a transmission portion 22 of a main mirror 20, nd denotes a refractive index, vd denotes an Abbe's number, obj denotes an object surface, and img denotes an image surface. In each of the drawings showing the embodiments, at least one filter 60 may be disposed closest to the image side I.

First Embodiment

FIG. 1 shows the reflective type telephoto lens 100 according to the first embodiment, and the following table 1 shows design data of the first embodiment. In FIG. 1, reference numerals for lens surfaces of the lenses are shown; however, reference numerals of lens surfaces are omitted in other drawings.

TABLE 1

| Lens surface | R | Dn | H-Aper | Obscuration | nd | vd |
|---|---|---|---|---|---|---|
| obj | ∞ | D1 | | | | |
| S1 | 337.244 | 9 | 38.7 | 18.5 | 1.5168 | 64.2 |
| S2 | ∞ | 68 | 38.42 | | | |
| S3 | −203.289 | 8 | 34.52 | 15 | 1.5168 | 64.2 |
| S4 | −286.926 | −8 | 34.69 | 15 | Reflect | |
| S5 | −203.289 | −65 | 32.76 | 15 | | |
| S6 | −91.576 | −5 | 16.2 | | 1.56883 | 56.04 |
| S7 | −183.781 | −0.7 | 15.2 | | | |
| S8 | −934.948 | −4 | 15.14 | | 1.7495 | 35.04 |
| S9 | −227.402 | 4 | 14.35 | | Reflect | |
| S10 | −934.948 | 0.7 | 14.11 | | | |
| S11 | −183.781 | 5 | 14.08 | | 1.56883 | 56.04 |
| S12 | −91.576 | 26.5 | 13.89 | | | |
| S13(ST) | ∞ | D2 | 9.6 | | | |
| S14 | 607.336 | 3.23 | 9.67 | | 1.7495 | 35.04 |
| S15 | −39.368 | 1 | 9.66 | | 1.697 | 48.51 |
| S16 | 43.456 | D3 | 9.62 | | | |
| S17 | 55.943 | 4 | 11 | | 1.48749 | 70.44 |
| S18 | 560.823 | D4 | 11 | | | |
| S19 | ∞ | 2.8 | 14.47 | | 1.5168 | 64.2 |
| S20 | ∞ | D5 | 14.57 | | | |
| img | ∞ | 0 | | | | |

Next, table 2 shows variable distance, the half-viewing angle, and FNo at an infinite object distance and a near distance.

TABLE 2

| | Infinite object distance | Near distance |
|---|---|---|
| D1 | ∞ | 3849.97647 |
| D2 | 1.26 | 20.17915 |
| D3 | 21.8791 | 2.95994 |
| D4 | 76.35443 | 76.35443 |
| D5 | 1.011176 | 1.019147 |
| EFL/MAG | 389.9752 | 0.10482 |
| HFOV | 2.129 | 1.75 |
| FNo | 5.041 | 6.11 |

Figure 3:
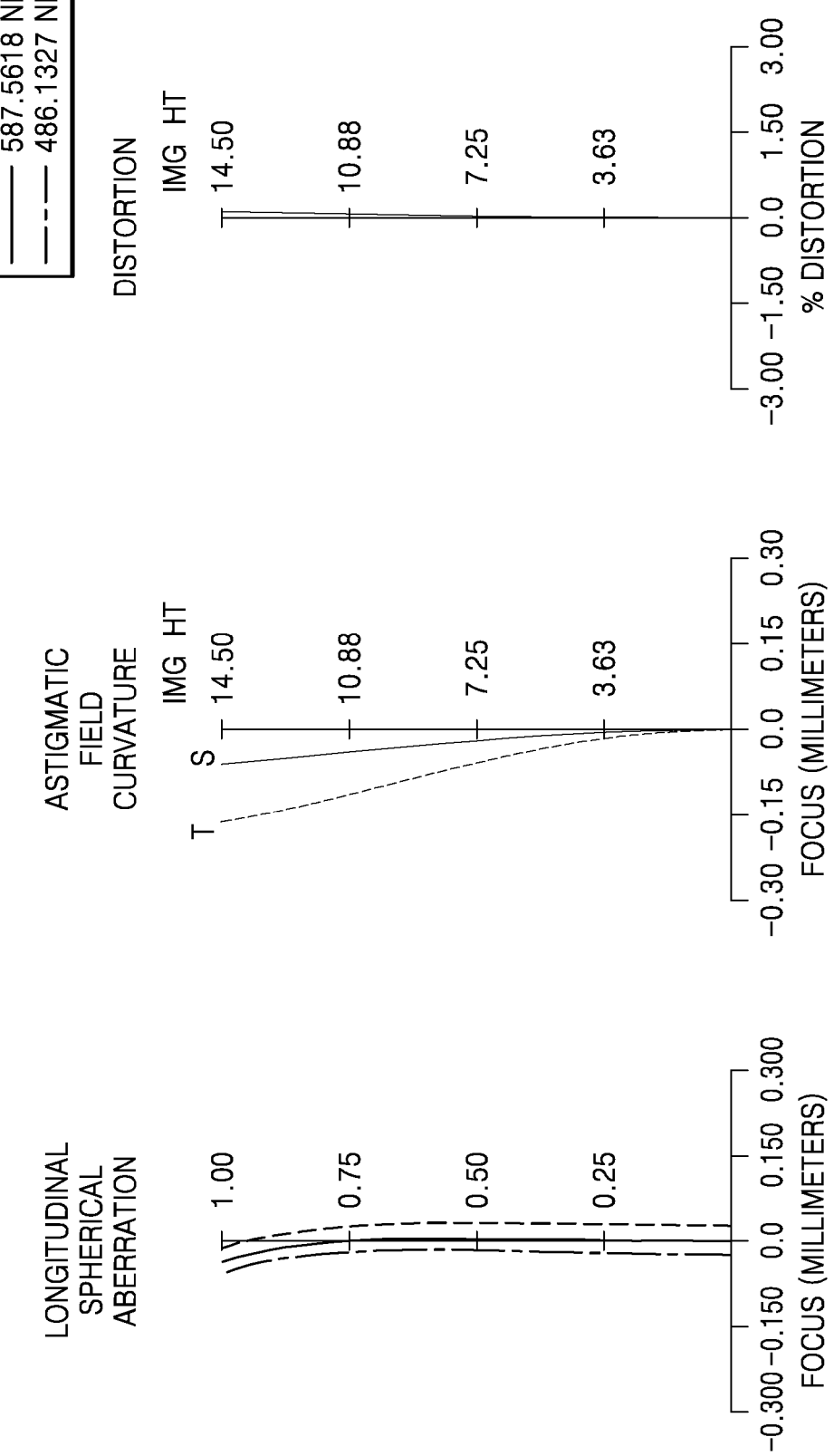
FIG. 3 is a diagram showing aberration of the reflective type telephoto lens of FIG. 1.
Figure 4:
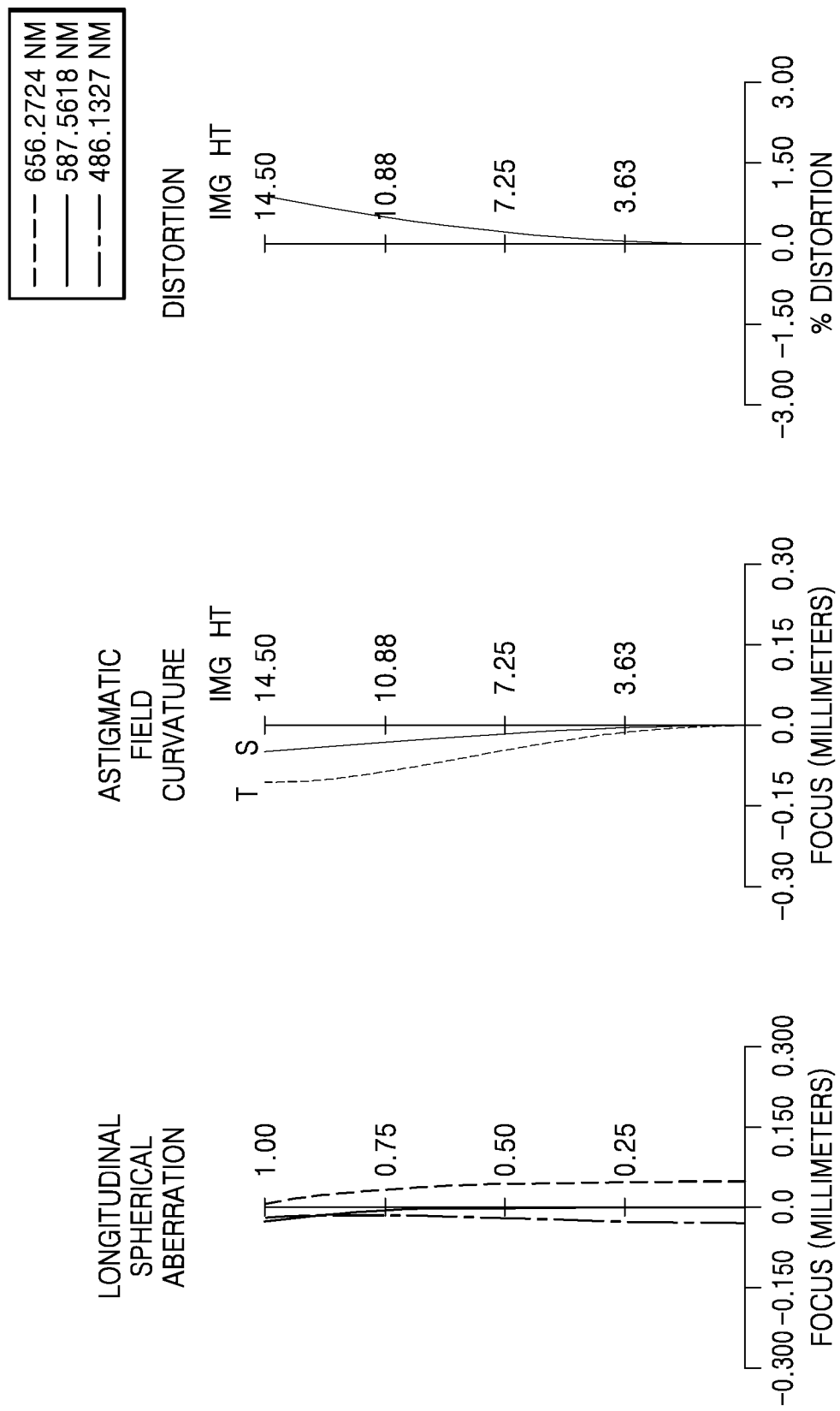
FIG. 4 is a diagram showing aberration of the reflective type telephoto lens of FIG. 2.

FIG. 3 shows longitudinal spherical aberration, astigmatic field curvature, and distortion of the reflective type telephoto lens 100 according to the first embodiment at an infinite object distance. FIG. 4 shows longitudinal spherical aberration, astigmatic field curvature, and distortion of the reflective type telephoto lens 100 according to the first embodiment at a near object distance.

The spherical aberration is shown with respect to a C-line, a d-line, and an F-line. The C-line is 656.3 nm, the d-line is 587.6 nm, and the F-line is 486.1 nm. In the astigmatic field curvature, a solid line denotes sagittal astigmatic field curvature, and a dotted line denotes tangential astigmatic field curvature.

Second Embodiment

FIG. 5 shows the reflective type telephoto lens 100 according to a second embodiment, and the following table 2 shows design data of the second embodiment.

TABLE 3

| Lens surface | R | Dn | H-Aper | Obscuration | nd | vd |
|---|---|---|---|---|---|---|
| obj | ∞ | D1 | | | | |
| S1 | 286.758 | 10 | 45.01 | 17.5 | 1.5168 | 64.2 |
| S2 | ∞ | 54.24 | 44.5 | | | |
| S3 | −155.243 | 6 | 38.81 | 15 | 1.5168 | 64.2 |
| S4 | −219.126 | −6 | 38.93 | 15 | Reflect | |
| S5 | −155.243 | −51.24 | 36.48 | 15 | | |
| S6 | −65.796 | −5 | 16 | | 1.62041 | 60.34 |
| S7 | −128.185 | −0.7 | 14.88 | | | |
| S8 | −426.539 | −2 | 14.84 | | 1.7995 | 42.34 |
| S9 | −148.398 | 2 | 14.28 | | Reflect | |
| S10 | −426.539 | 0.7 | 14.2 | | | |
| S11 | −128.185 | 5 | 14.19 | | 1.62041 | 60.34 |
| S12 | −65.796 | 26.5 | 14.14 | | | |
| S13(ST) | ∞ | D2 | 9.68 | | | |
| S14 | −199.365 | 3.23 | 9.28 | | 1.7995 | 42.34 |
| S15 | −29.506 | 1 | 9.3 | | 1.691 | 54.7 |
| S16 | 33.557 | 12.53 | 9.26 | | | |
| S17 | 46.374 | 4 | 11.64 | | 1.51823 | 58.96 |
| S18 | ∞ | D3 | 11.72 | | | |
| S19 | ∞ | 3.7 | 14.37 | | 1.5168 | 64.2 |
| S20 | ∞ | D4 | 14.47 | | | |
| Img | ∞ | | | | | |

Next, table 4 shows variable distance, the half-viewing angle, and FNo at an infinite object distance and a near distance.

TABLE 4

| | Infinite object distance | Near distance |
|---|---|---|
| D1 | ∞ | 4000 |
| D2 | 1.26 | 19.26 |
| D3 | 76.06633 | 58.06632 |
| D4 | 1.065888 | 1.089076 |
| EFL/MAG | 390.0952 | 0.09861 |
| HFOV | 2.121 | 1.812 |
| FNo | 5.091 | 5.426 |

Figure 7:
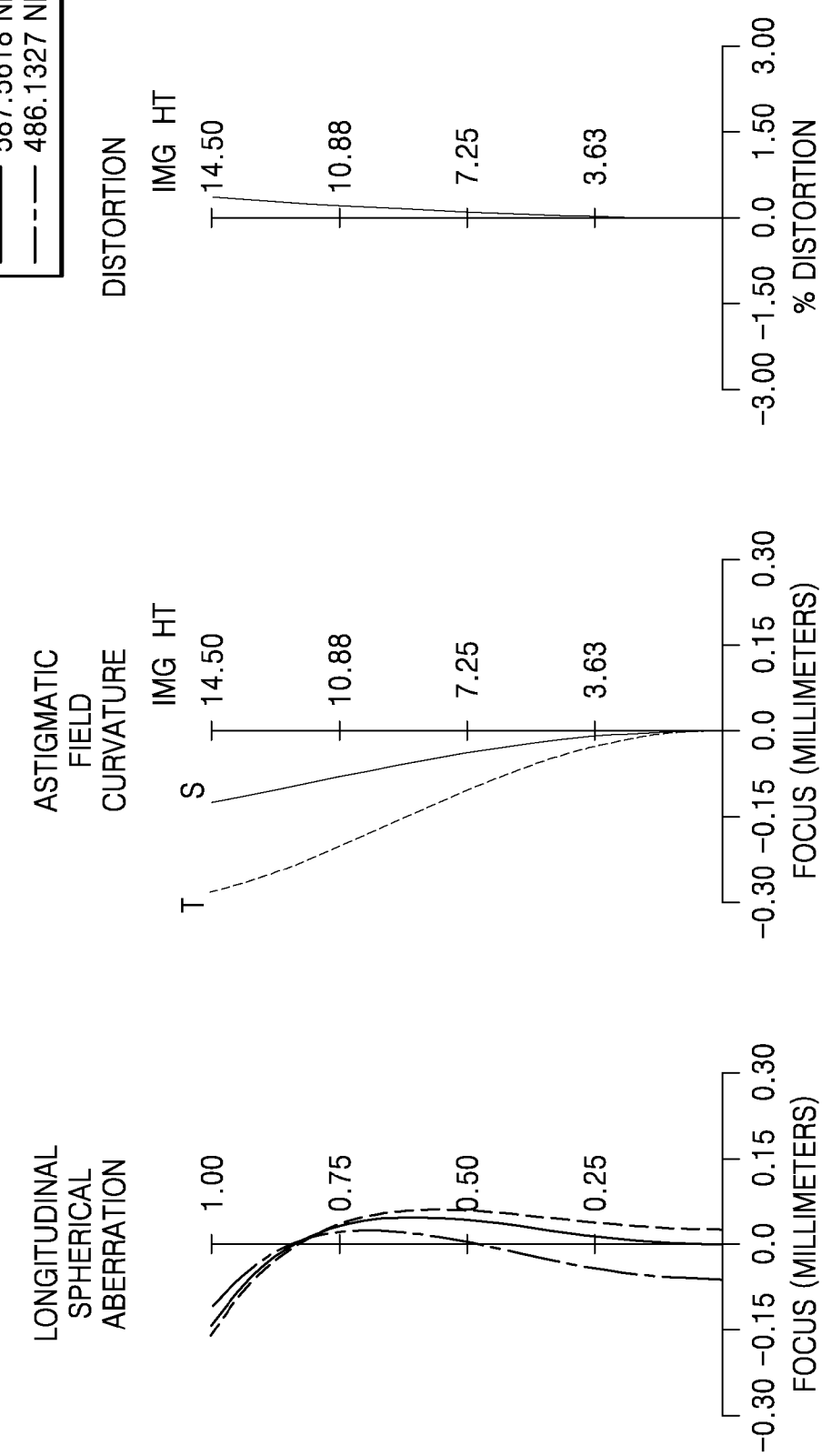
FIG. 7 is a diagram showing aberration of the reflective type telephoto lens of FIG. 5.
Figure 8:
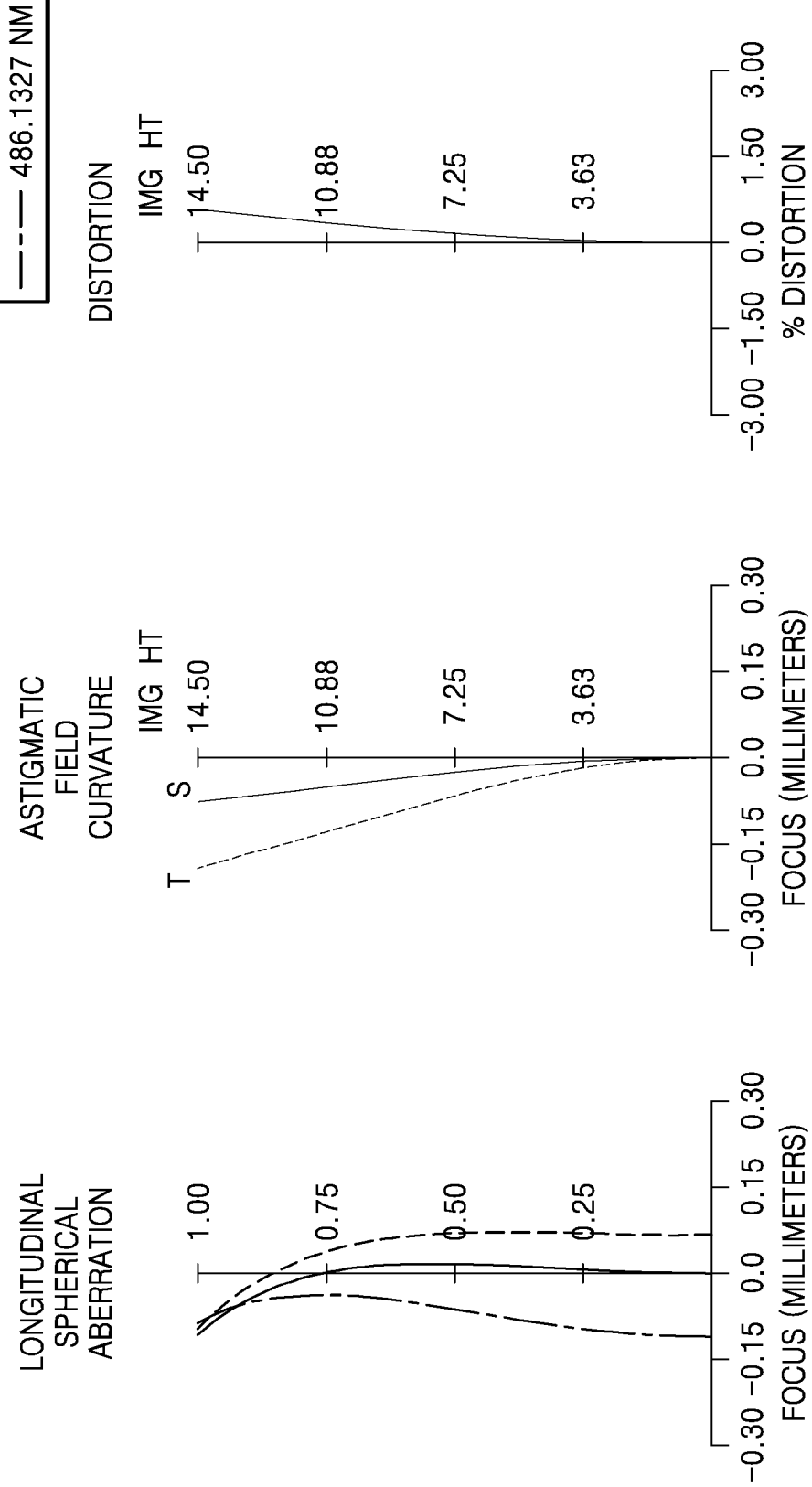
FIG. 8 is a diagram showing aberration of the reflective type telephoto lens of FIG. 6.

FIG. 7 shows longitudinal spherical aberration, astigmatic field curvature, and distortion of the reflective type telephoto lens according to the second embodiment at an infinite object distance. FIG. 8 shows longitudinal spherical aberration, astigmatic field curvature, and distortion of the reflective type telephoto lens according to the second embodiment at a near object distance.

Third Embodiment

FIG. 9 shows the reflective type telephoto lens 100 according to a third embodiment, and the following table 5 shows design data of the third embodiment.

TABLE 5

| Lens surface | R | Dn | H-Aper | Obscuration | nd | vd |
|---|---|---|---|---|---|---|
| obj | ∞ | D1 | | | | |
| S1 | 404.821 | 8 | 45 | 17.5 | 1.5168 | 64.2 |
| S2 | −962.912 | 66.05 | 44.75 | | | |
| S3 | −165.549 | 6 | 45 | 15 | 1.5168 | 64.2 |
| S4 | −255.521 | −6 | 38.03 | 15 | Reflect | |
| S5 | −165.549 | −63.05 | 35.92 | 15 | | |
| S6 | −75.195 | −4 | 15.5 | | 1.6516 | 58.4 |
| S7 | −189.522 | −1 | 14.81 | | | |
| S8 | −1200 | −2 | 14.64 | | 1.72342 | 37.99 |
| S9 | −180.628 | 2 | 14.16 | | Reflect | |
| S10 | −1200 | 1 | 14.07 | | | |
| S11 | −189.522 | 4 | 14.03 | | 1.6516 | 58.4 |

TABLE 5-continued

| Lens surface | R | Dn | H-Aper | Obscuration | nd | vd |
|---|---|---|---|---|---|---|
| S12 | −75.195 | 28 | 13.99 | | | |
| S13(ST) | ∞ | D2 | 9.6 | | | |
| S14 | −238.281 | 3.5 | 9.13 | | 1.7995 | 42.34 |
| S15 | −30.786 | 1.5 | 9.17 | | 1.691 | 54.7 |
| S16 | 32.627 | 10.85 | 9.15 | | | |
| S17 | 42.837 | 4 | 11.42 | | 1.51823 | 58.96 |
| S18 | ∞ | D3 | 11.5 | | | |
| S19 | ∞ | 2.8 | 14.38 | | 1.5168 | 64.2 |
| S20 | ∞ | D4 | 14.46 | | | |
| Img | ∞ | | | | | |

Next, table 6 shows variable distance, the half-viewing angle, and FNo at an infinite object distance and a near distance.

TABLE 6

| | Infinite object distance | Near distance |
|---|---|---|
| D1 | ∞ | 4000 |
| D2 | 1.26 | 22.26 |
| D3 | 76.4711 | 55.47098 |
| D4 | 1.029071 | 1.038376 |
| EFL/MAG | 390.0117 | 0.09734 |
| HFOV | 2.123 | 1.807 |
| FNo | 5.108 | 5.443 |

Figure 11:
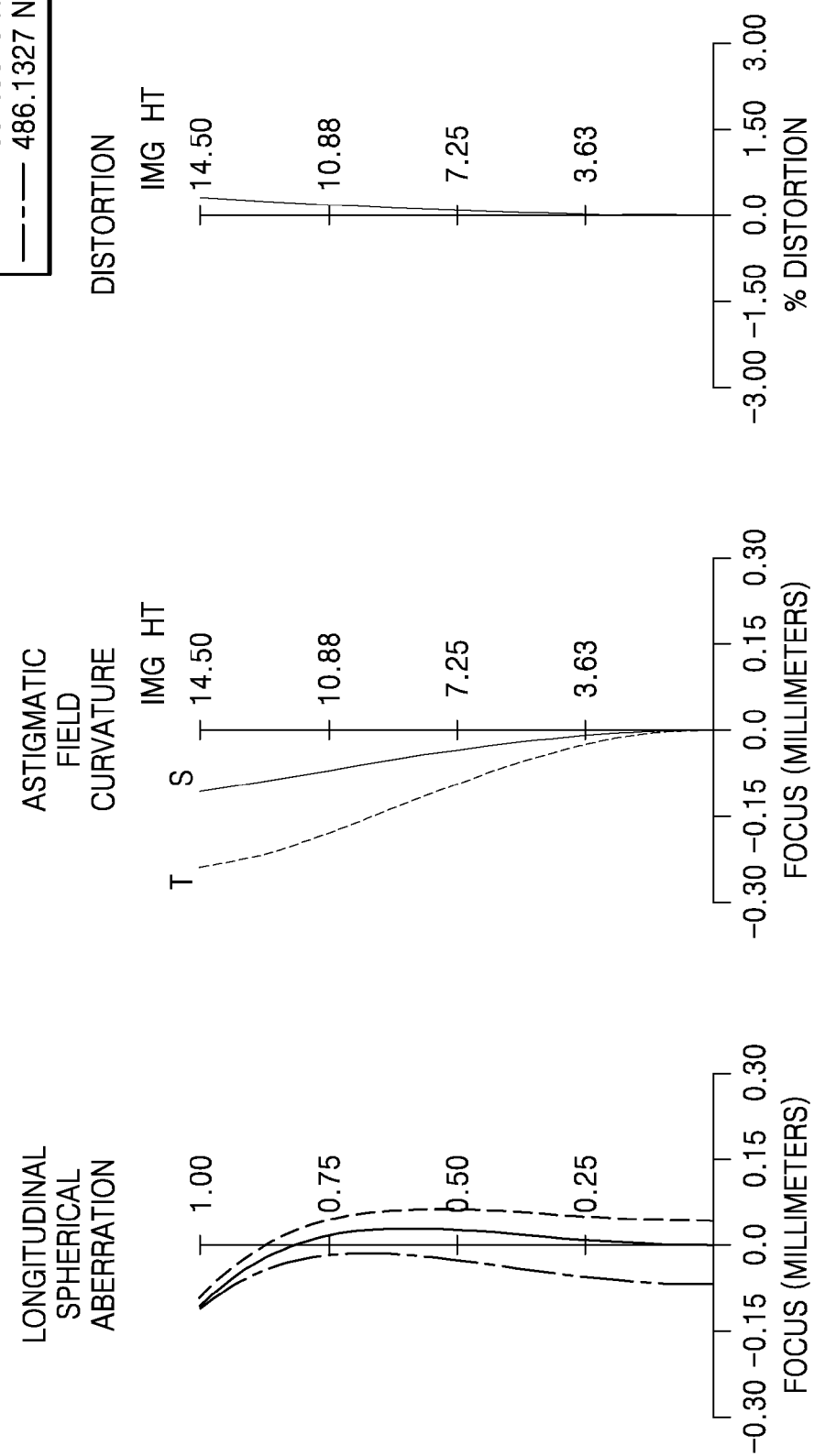
FIG. 11 is a diagram showing aberration of the reflective type telephoto lens of FIG. 9.
Figure 12:
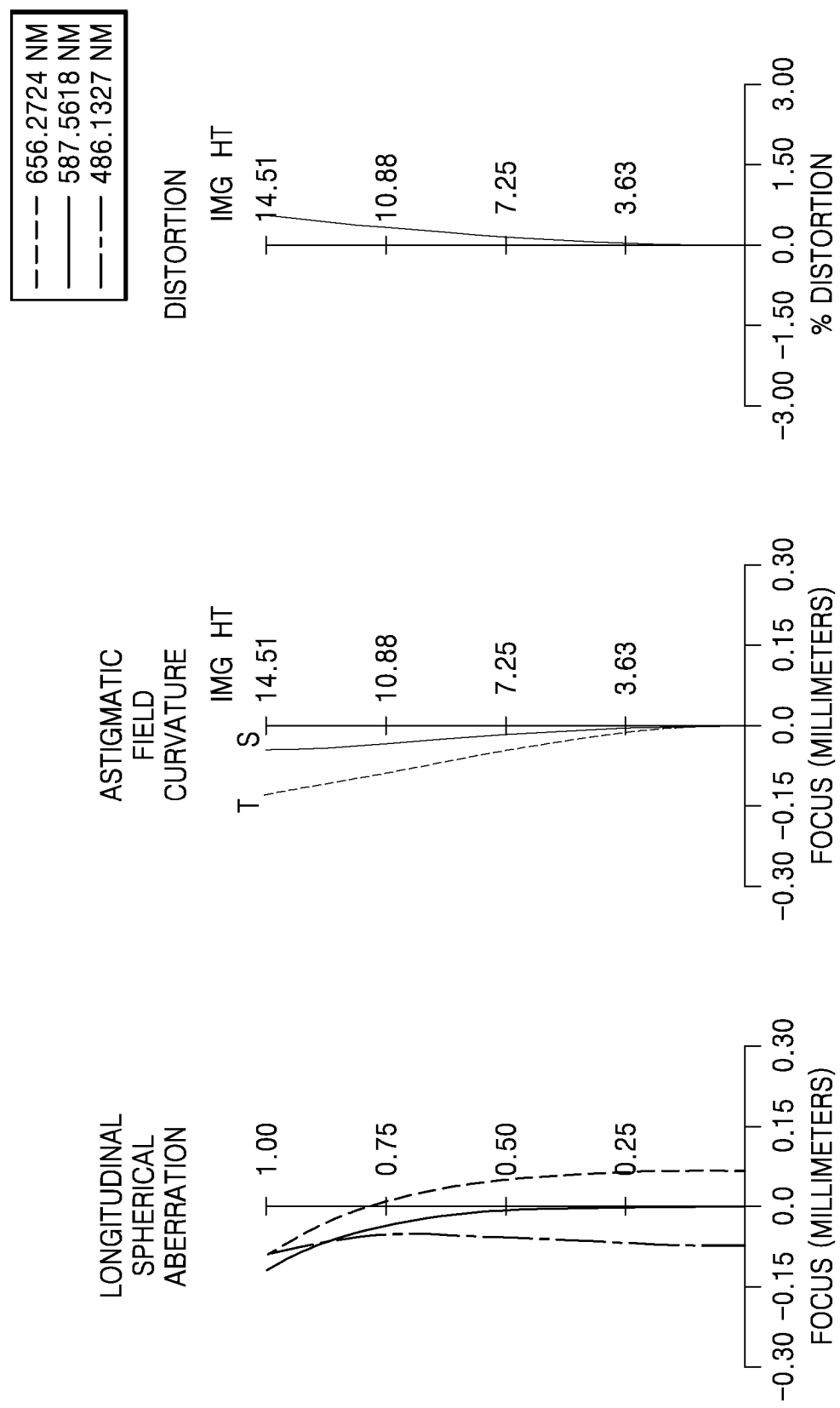
FIG. 12 is a diagram showing aberration of the reflective type telephoto lens of FIG. 10.

FIG. 11 shows longitudinal spherical aberration, astigmatic field curvature, and distortion of the reflective type telephoto lens according to the third embodiment at an infinite object distance. FIG. 12 shows longitudinal spherical aberration, astigmatic field curvature, and distortion of the reflective type telephoto lens according to the third embodiment at a near object distance.

Fourth Embodiment

Figure 13:
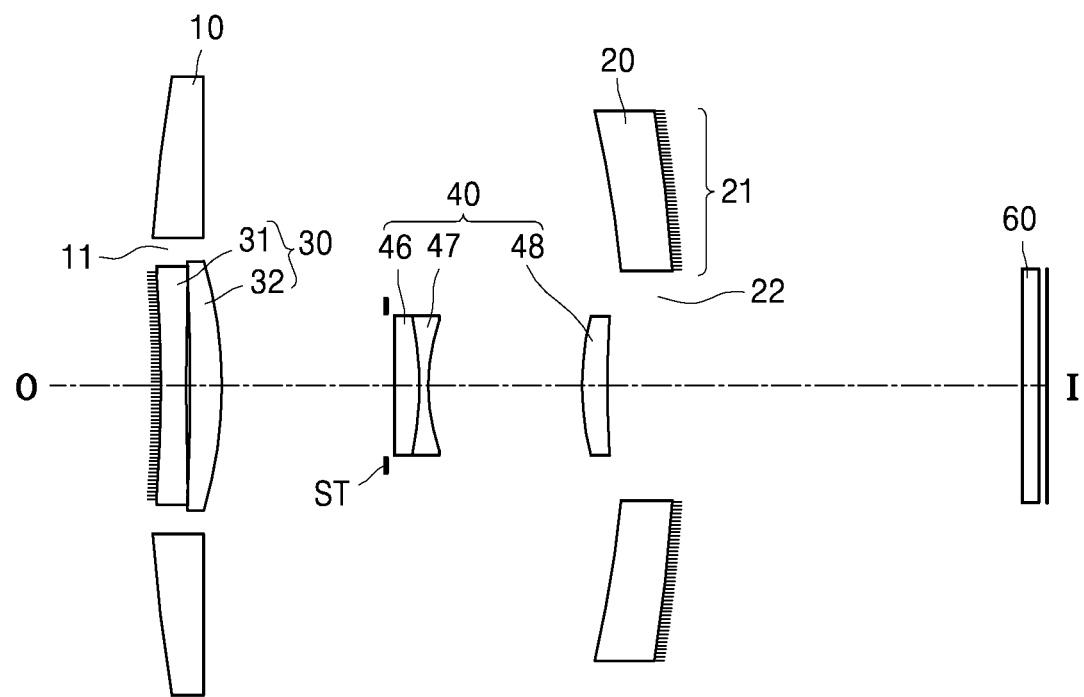
FIG. 13 is a diagram showing a reflective type telephoto lens with respect to an infinite object distance, according to another embodiment.

FIG. 13 shows the reflective type telephoto lens 100 according to a fourth embodiment, and the following table 7 shows design data of the fourth embodiment.

TABLE 7

| Lens surface | R | Dn | H-Aper | Obscuration | nd | vd |
|---|---|---|---|---|---|---|
| obj | ∞ | D1 | | | | |
| S1 | 236.336 | 6.75 | 37.5 | 18 | 1.5168 | 64.2 |
| S2 | ∞ | 51 | 37.27 | 18 | | |
| S3 | −146.726 | 6 | 33.13 | 14 | 1.5168 | 64.2 |
| S4 | −214.196 | −6 | 33.3 | 14 | Reflect | |
| S5 | −146.726 | −53.25 | 31.28 | 14 | | |
| S6 | −54.304 | −3.75 | 15.1 | | 1.497 | 81.61 |
| S7 | −290.668 | −0.525 | 14.48 | | | |
| S8 | 839.663 | −3 | 14.45 | | 1.7725 | 49.62 |
| S9 | −158.25 | 3 | 13.56 | | Reflect | |
| S10 | 839.663 | −0.525 | 13.31 | | | |
| S11 | −290.668 | 3.75 | 13.3 | | 1.497 | 81.61 |
| S12 | −54.304 | 19.875 | 13.17 | | | |
| S13(ST) | ∞ | D2 | 8.65 | | | |
| S14 | −533.073 | 3 | 8.5 | | 1.834 | 37.34 |
| S15 | −44.008 | 1.13 | 8.5 | | 1.618 | 63.39 |
| S16 | 27.188 | D3 | 8 | | | |
| S17 | 34.011 | 3 | 8.5 | | 1.48749 | 70.44 |
| S18 | 116.817 | D4 | 8.5 | | | |
| S19 | ∞ | 2 | 14.0 | | 1.5168 | 64.2 |
| S20 | ∞ | D5 | 14.15 | | | |
| img | ∞ | 0 | | | | |

Next, table 8 shows variable distance, the half-viewing angle, and FNo at an infinite object distance and a near distance.

TABLE 8

| | Infinite object distance | Near distance |
|---|---|---|
| D1 | ∞ | 2831.156394 |
| D2 | 0.945 | 14.011863 |
| D3 | 18.438041 | 5.371177 |
| D4 | 49.944011 | 49.944011 |
| D5 | 1.023017 | 1.011356 |
| EFL/MAG | 292.549 | 0.105 |
| HFOV | 2.80 | 2.28 |
| FNo | 4.00 | 4.78 |

Figure 14:
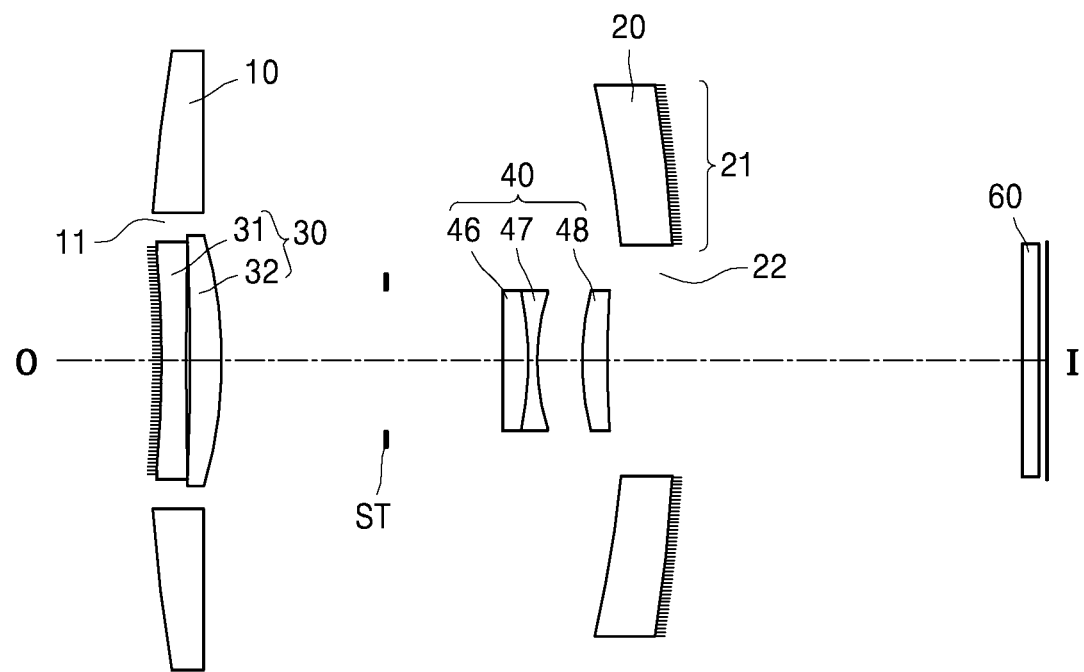
FIG. 14 is a diagram showing the reflective type telephoto lens of FIG. 13 with respect to a definite object distance (e.g., obj=4 m)
Figure 15:
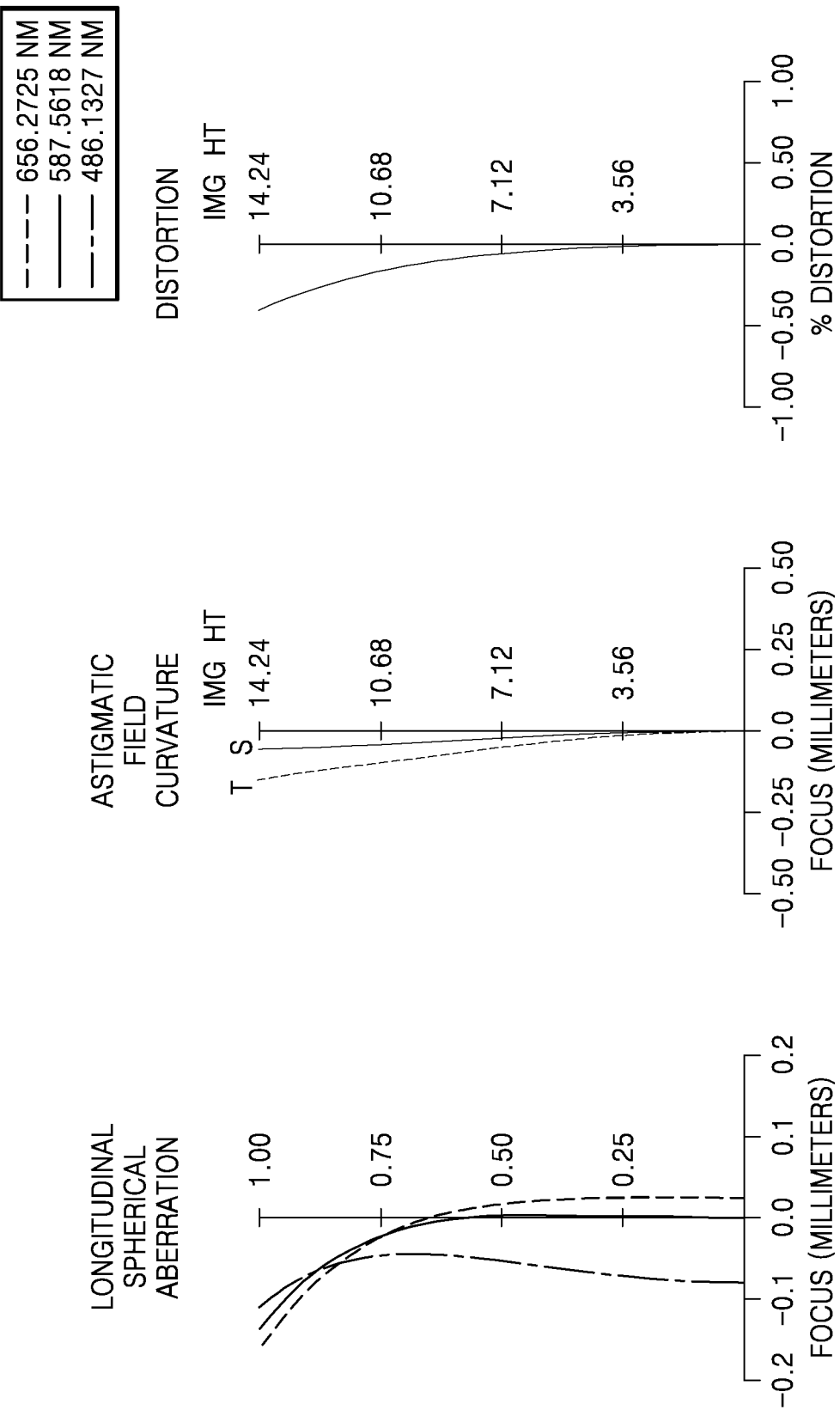
FIG. 15 is a diagram showing aberration of the reflective type telephoto lens of FIG. 13.

FIG. 14 shows longitudinal spherical aberration, astigmatic field curvature, and distortion of the reflective type telephoto lens according to the fourth embodiment at an infinite object distance. FIG. 15 shows longitudinal spherical aberration, astigmatic field curvature, and distortion of the reflective type telephoto lens according to the fourth embodiment at a near object distance.

The following table 9 shows focal lengths for calculating inequalities (1), (2), and (3).

TABLE 9

| | Focal length of main mirror ($f_{primary}$) | Focal length of sub-mirror group ($f_{secondary}$) | Focal length of focusing lens group ($f_{AF}$) | Combined focal length of first lens, main mirror and sub-mirror group ($f_{before}$) | Entire focal length (f) |
|---|---|---|---|---|---|
| 1st embodiment | 175.415 | −147.676 | −74.395 | 250.518 | 389.975 |
| 2nd embodiment | 134.066 | −102.100 | −146.169 | 212.721 | 390.095 |
| 3rd embodiment | 171.258 | −154.997 | −162.109 | 223.926 | 390.012 |
| 4th embodiment | 134.815 | −124.081 | −51.602 | 177.364 | 292.549 |

The following table 10 shows that the first through third embodiments respectively satisfy the inequalities (1) through (3).

TABLE 10

| | 1st embodiment | 2nd embodiment | 3rd embodiment | 4th embodiment |
|---|---|---|---|---|
| Inequality 1 | 0.642 | 0.545 | 0.574 | 0.606 |
| Inequality 2 | 1.189 | 1.313 | 1.105 | 1.087 |
| Inequality 3 | 0.191 | 0.375 | 0.416 | 0.176 |

As described above, according to the embodiments, the reflective type telephoto lens may be compact by using two mirrors, and may reduce power consumption and perform a high speed focusing by using a simple focusing lens group. Also, a bright optical system may be realized by reducing obscured light amount of the reflective type telephoto lens.

Figure 17:
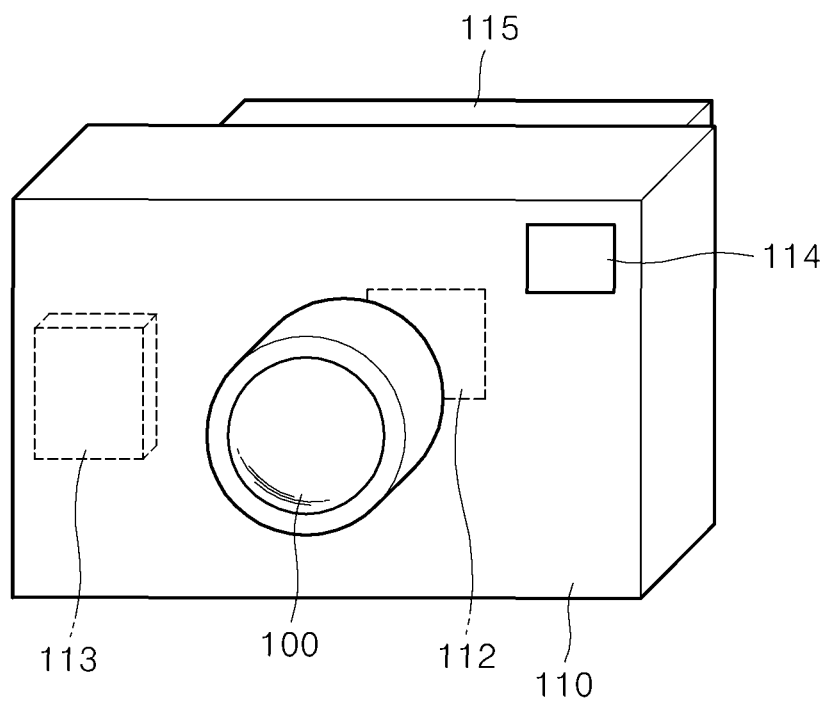
FIG. 17 is a diagram showing a photographing apparatus including a reflective type telephoto lens, according to an embodiment.

FIG. 17 shows a photographing apparatus including the reflective type telephoto lens 100, according to the embodiment. The photographing apparatus includes the reflective type telephoto lens 100 described in the above embodiments, and an imaging device 112 receiving light focused by the reflective type telephoto lens 100. The photographing apparatus may include a recording unit 113 in which information corresponding to an object image that is photoelectrically converted by the imaging device 112 is recorded, and a view finder 114 for observing the object image. In addition, a display unit 115 on which the object image is displayed may be further included. Here, the view finder 114 and the display unit 115 are separate; however, only the display unit 115 may be included without the view finder 114. The photographing apparatus shown in FIG. 17 is only an example, and the invention is not limited thereto and may be applied to various optical devices. As described above, by applying the reflective type telephoto lens according to the embodiments to the photographing apparatus such as a digital camera, an optical device that may perform an auto focusing operation rapidly and may take a picture brightly may be realized.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A reflective type telephoto lens comprising:
a first lens that receives an incident flux of light from an object side;
a main mirror comprising a reflective unit that reflects light transmitted through the first lens toward the object side, and a transmission portion disposed on a center portion thereof;
a sub-mirror group comprising a sub-mirror that reflects light from the main mirror toward an image side; and
a focusing lens group that focuses the light reflected by the sub-mirror,
wherein the first lens comprises an accommodation portion disposed on a center portion thereof, and the sub-mirror group is disposed in the accommodation portion, and
wherein the reflective type telephoto lens satisfies the following inequality $$0.4 \leq \frac{f_{before}}{f} \leq 0.8,$$

where $f_{before}$ denotes a combined focal length of the first lens, the main mirror, and the sub-mirror group located in front of the focusing lens group, and f denotes an entire focal length of the reflective type telephoto lens.

2. The reflective type telephoto lens of claim 1, wherein the reflective type telephoto lens satisfies following inequality $$0.9 \leq \left| \frac{f_{primary}}{f_{secondary}} \right| \leq 1.5,$$

where $f_{primary}$ denotes a focal length of the main mirror, and $f_{secondary}$ denotes a focal length of the sub-mirror group.

3. The reflective type telephoto lens of claim 1, wherein the reflective type telephoto lens satisfies following inequality $$0.1 \leq \left| \frac{f_{AF}}{f} \right| \leq 0.6,$$

where $f_{AF}$ denotes a focal length of the focusing lens group, and f denotes the entire focal length of the reflective type telephoto lens.

4. The reflective type telephoto lens of claim 1, wherein the focusing lens group comprises three or less lenses.

5. The reflective type telephoto lens of claim 1, wherein the focusing lens group comprises at least one biconcave lens.

6. The reflective type telephoto lens of claim 1, wherein the focusing lens group comprises a biconvex lens and a biconcave lens.

7. The reflective type telephoto lens of claim 1, wherein the focusing lens group comprises a planoconvex lens and a biconcave lens.

8. The reflective type telephoto lens of claim 1, wherein the focusing lens group comprises a biconvex lens, a biconcave lens, and a planoconvex lens.

9. The reflective type telephoto lens of claim 1, wherein a stop is disposed between the sub-mirror and the focusing lens group.

10. The reflective type telephoto lens of claim 1, wherein the sub-mirror group comprises a second lens next to the sub-mirror.

11. A reflective type telephoto lens comprising:
a first lens that receives an incident flux of light from an object side;
a main mirror comprising a reflective unit that reflects light transmitted through the first lens toward the object side, and a transmission portion disposed on a center portion thereof;
a sub-mirror group comprising a sub-mirror that reflects light from the main mirror toward an image side; and
a focusing lens group that focuses the light reflected by the sub-mirror,
wherein the focusing lens group is disposed on an optical axis between the main mirror and the sub-mirror, and wherein the reflective type telephoto lens satisfies the following inequality $$0.4 \leq \frac{f_{before}}{f} \leq 0.8,$$

where $f_{before}$ denotes a combined focal length of the first lens, the main mirror, and the sub-mirror group located in front of the focusing lens group, and f denotes an entire focal length of the reflective type telephoto lens.

12. The reflective type telephoto lens of claim 1, wherein the reflective type telephoto lens has a half-viewing angle ranging from 2° to 3°.

13. The reflective type telephoto lens of claim 1, wherein an entire length of the reflective type telephoto lens is not changed when the focusing lens group performs a focusing operation.

14. A reflective type telephoto lens comprising:
a first lens that receives an incident flux of light from an object side;
a main mirror comprising a reflective unit that reflects light transmitted through the first lens toward the object side, and a transmission portion disposed on a center portion thereof;
a sub-mirror group comprising a sub-mirror that reflects light from the main mirror toward an image side; and
a focusing lens group that focuses the light reflected by the sub-mirror,
wherein the first lens comprises an accommodation portion disposed on a center portion thereof, and the sub-mirror group is disposed in the accommodation portion, and
wherein the reflective type telephoto lens satisfies the following inequality $$0.9 \leq \left| \frac{f_{primary}}{f_{secondary}} \right| \leq 1.5,$$

where $f_{primary}$ denotes a focal length of the main mirror, and $f_{secondary}$ denotes a focal length of the sub-mirror group.

15. The reflective type telephoto lens of claim 14, wherein the reflective type telephoto lens satisfies the following inequality $$0.1 \leq \left|\frac{f_{AF}}{f}\right| \leq 0.6,$$

where $f_{AF}$ denotes a focal length of the focusing lens group, and f denotes an entire focal length of the reflective type telephoto lens.

16. The reflective type telephoto lens of claim 14, wherein the focusing lens group comprises three or less lenses.

17. The reflective type telephoto lens of claim 14, wherein the focusing lens group comprises at least one biconcave lens.

18. The reflective type telephoto lens of claim 14, wherein the focusing lens group comprises a biconvex lens and a biconcave lens.

19. The reflective type telephoto lens of claim 14, wherein the focusing lens group comprises a planoconvex lens and a biconcave lens.

20. A photographing apparatus comprising:
a reflective type telephoto lens; and
an imaging device that receives light focused by the reflective type telephoto lens,
wherein the reflective type telephoto lens comprises:
   a first lens that receives an incident flux of light from an object side;
   a main mirror comprising a reflective unit that reflects light transmitted through the first lens toward the object side, and a transmission portion disposed on a center portion thereof;
   a sub-mirror group comprising a sub-mirror that reflects light from the main mirror toward an image side; and
   a focusing lens group that focuses the light reflected by the sub-mirror,
wherein the first lens comprises an accommodation portion disposed on a center portion thereof, and the sub-mirror group is disposed in the accommodation portion, and
wherein the reflective type telephoto lens satisfies the following inequality $$0.4 \leq \frac{f_{before}}{f} \leq 0.8,$$

where $f_{before}$ denotes a combined focal length of the first lens, the main mirror, and the sub-mirror group located in front of the focusing lens group, and f denotes an entire focal length of the reflective type telephoto lens.

21. The photographing apparatus of claim 20, wherein the photographing apparatus satisfies the following equation $$0.1 \leq \left|\frac{f_{AF}}{f}\right| \leq 0.6,$$

where $f_{AF}$ denotes a focal length of the focusing lens group, and f denotes the entire focal length of the reflective type telephoto lens.

22. The photographing apparatus of claim 20, wherein the photographing apparatus satisfies the following equation $$0.9 \leq \left|\frac{f_{primary}}{f_{secondary}}\right| \leq 1.5,$$

where $f_{primary}$ denotes a focal length of the main mirror, and $f_{secondary}$ denotes a focal length of the sub-mirror group.

* * * * *